H. C. MULVANEY.

WALL BED.

APPLICATION FILED AUG. 20, 1913.

Reissued May 26, 1914.

13,736.

3 SHEETS—SHEET 1.

Witnesses:-
Clarence J. Williams
Flounce Williams

Inventor
Henry C. Mulvaney.
by Lemer G. Wells,
Attorney.

H. C. MULVANEY.

WALL BED.

APPLICATION FILED AUG. 20, 1913.

Reissued May 26, 1914.

13,736.

3 SHEETS—SHEET 2.

Witnesses:-
Charles J. Williams.
Thomas Williams

Inventor
Henry C. Mulvaney
by Seymour G. Wells,
attorney.

H. C. MULVANEY.

WALL BED.

APPLICATION FILED AUG. 20, 1913.

Reissued May 26, 1914.

13,736.

3 SHEETS—SHEET 3.

Witnesses:
Clarence J. Williams
Florence Williams

Inventor
Henry C. Mulvaney.
by Lemuel G. Wells,
Attorney.

UNITED STATES PATENT OFFICE.

HENRY C. MULVANEY, OF LOS ANGELES, CALIFORNIA.

WALL-BED.

Specification of Reissued Letters Patent. Reissued May 26, 1914.

13,736.

Original No. 1,001,214, dated August 22, 1911, Serial No. 608,704. Application for reissue filed August 20, 1913. Serial No. 785,794.

*To all whom it may concern:*

Be it known that I, HENRY C. MULVANEY, a citizen of the United States, residing at Los Angeles, California, have invented a new and useful Wall-Bed, of which the following is a specification.

My object is to produce a wall bed in which the facing or front moves up or back to the springs in folding so that the folded structure will be as thin as practical, thereby making it possible to house the wall bed in a thin wall; and my invention consists of the novel features herein shown, described and claimed.

Figure 1:
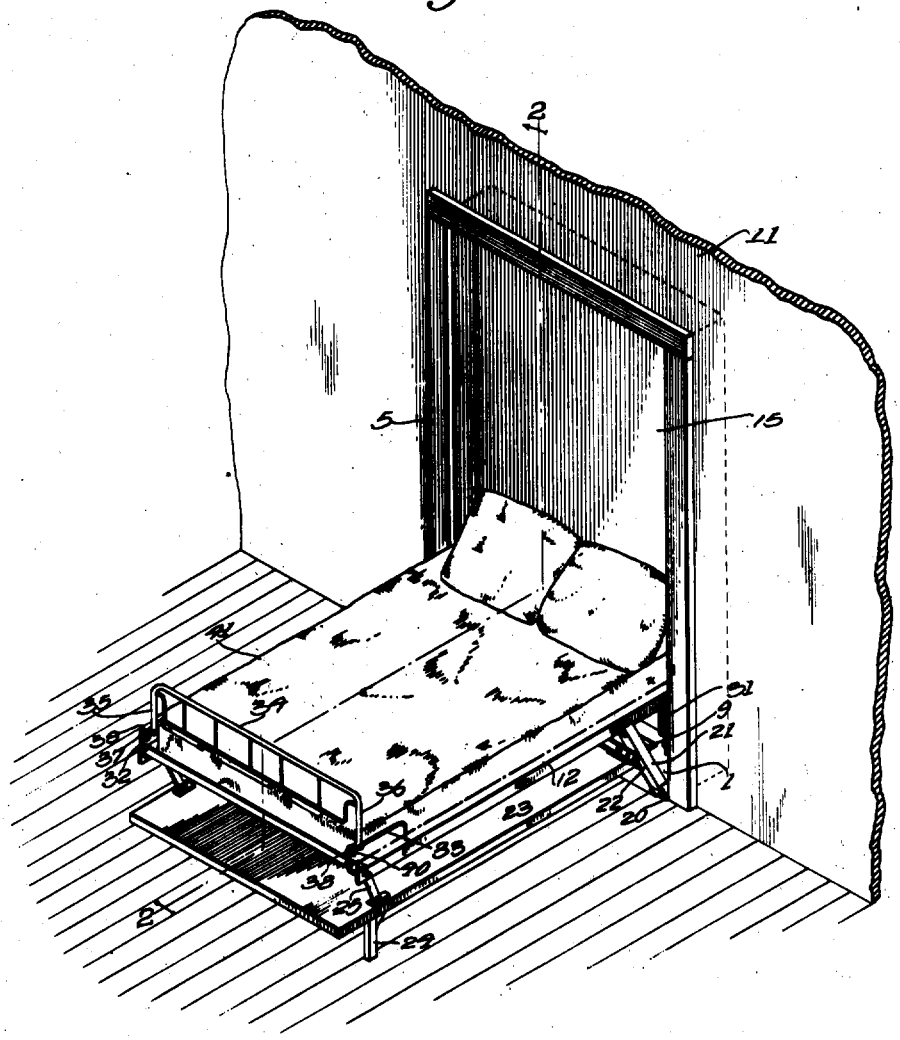
Figure 3:
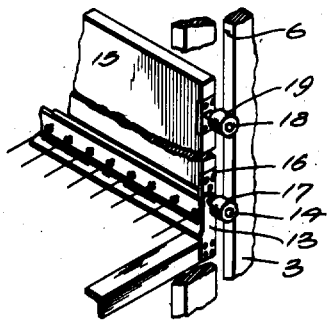
Figure 2:
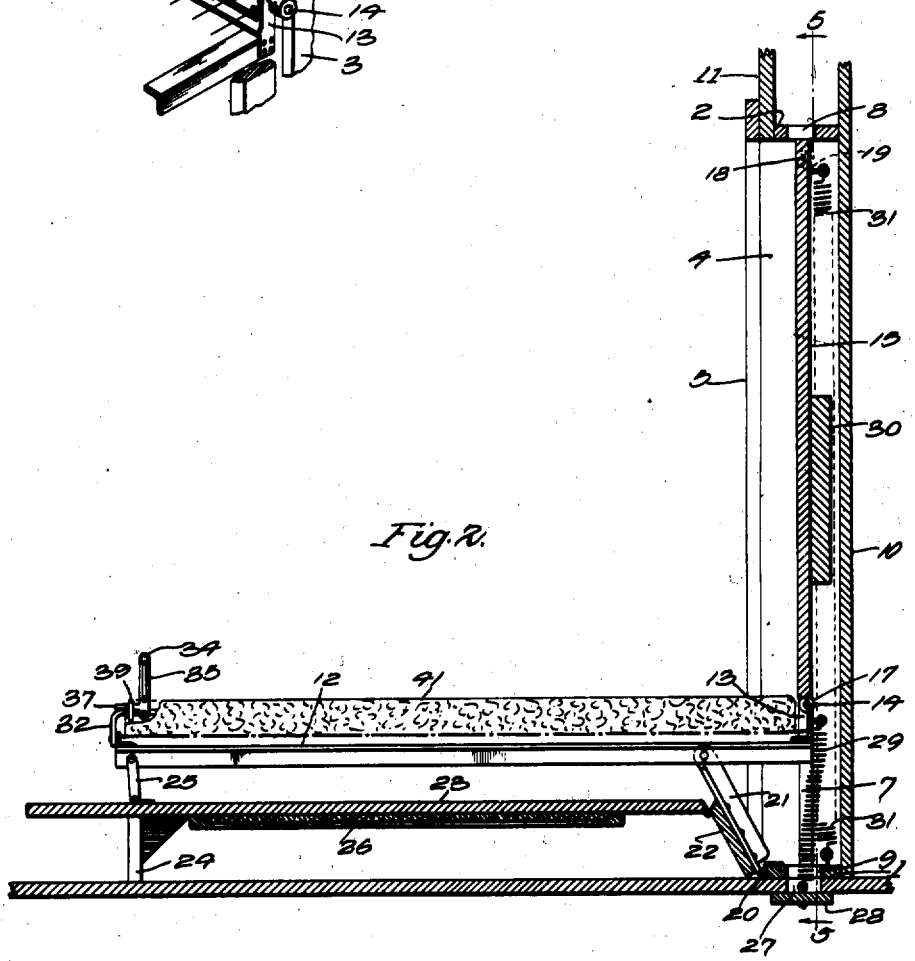
Figure 5:
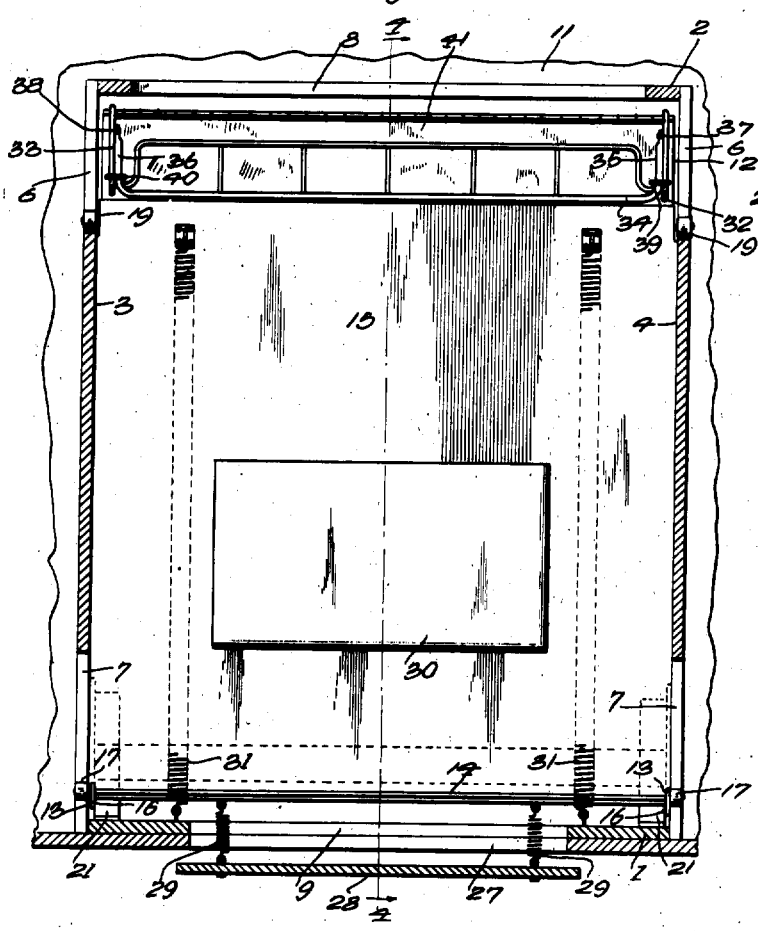
Figure 4:
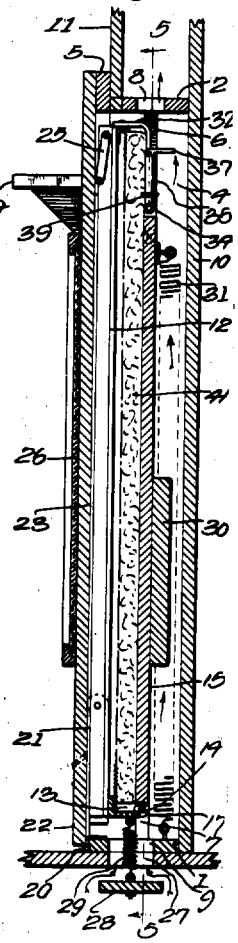

In the drawings:—Figure 1 is a perspective of the wall bed embodying the principles of my invention and made up for use. Fig. 2 is a vertical sectional detail on line 2—2 of Fig. 1. Fig. 3 is an enlarged fragmentary perspective showing the details of the sliding connection between the end of the bed frame, the foot-board and the casing. Fig. 4 is a vertical sectional detail analogous to Fig. 2 and showing the bed folded, the section being taken on line 4—4 of Fig. 5. Fig. 5 is a vertical sectional detail on a plane parallel with the wall and taken on line 5—5, Fig. 4.

Referring to the drawing in detail, I have shown my wall bed adapted to fold into a recess in a wall, but it is to be understood that the recess may be against the wall, if desired.

The recess frame comprises the base-board 1, the top-board 2, the side-boards 3 and 4, framing the base-board and top-board together, and the facing 5 extending along the front edges of the side-boards 3 and 4 and the front edge of the top-board 2, so as to make an appearance similar to a door frame. Vertical slots 6 are formed through the upper ends of the side-boards 3 and 4, and similar vertical slots 7 are formed through the lower ends of said side-boards. A ventilator opening 8 is formed through the top-board 2 and a similar ventilator opening 9 is formed through the base-board 1. The back board 10 of the recess frame as shown, is the farther facing of the wall from the room in which the bed is located and an opening is cut in the near facing 11 of the wall to receive the recess frame. Of course, where the wall has only a single thickness, the near facing 11 would not exist, or, if the recess frame was inserted through the near facing 11, the farther facing 10 would not exist and the back board would be applied to the recess frame.

The bed frame 12 is of the ordinary angle iron and fabric construction. Hinge members 13 are secured to the head corners of the bed frame and a shaft 14 is inserted through the hinge members above the upper edge of the angle iron. The head-board 15 has hinge members 16 upon its lower corners and the shaft 14 passes through these hinge members 16 so as to connect the head-board to the bed-frame. Rollers 17 are mounted upon the ends of the shaft 14 outside of the hinge members 13, and said rollers operate in the slots 7. Pintles 18 extend outwardly from the upper corners of the head-board 15, and rollers 19 are mounted upon these pintles and operate in the slots 6, so that the head-board 15 will move a limited distance in a vertical position. Hinges 20 are connected to the forward edge of the base-board 1 and at its ends, and links 21 are connected to the hinges 20 and to the side-rails of the bed frame short distances from their rear ends; said links serving as legs for the head end of the bed when in its horizontal position. The lower facing section 22 connects the links 21 and extends from the lower ends of the links about two-thirds of their lengths. The upper facing section 23 is hinged to the upper edge of the lower facing section 22. Legs 24 extend from the upper facing section 23 and links 25 connect the upper or outer ends of the side-rails of the bed frame to the facing section 23 in line with the legs 24. A mirror 26 is applied to the upper facing section 23.

A ventilator opening 27 is formed through the floor in line with the ventilator opening 9 in the base-board 1. A board 28 is placed below the floor and springs 29 connect the board 28 to the head-rail of the bed frame. A counter balancing weight 30 is secured to the back face of the head-board 15 and springs 31 are connected to the base-board 1 and to the top of the head-board 15. When the bed is unfolded and in use, as in Figs. 1 and 2, the tension of the springs 29 holds the board 28 against the floor so as to close the ventilator opening 27, and when the bed is folded and out of use, as in Figs. 4 and 5, the board 28 falls away from the floor so that air may pass through the opening 27 and upwardly through the recess around the bed and out through the opening 8. The counter balancing weight 30 and the tension of the springs 31 assists in raising the bed from its horizontal position and carries any desired part of the weight of the bed as it moves up or down.

When the bed is in its unfolded position, as in Fig. 2, the links 21 serve as legs for the head end of the bed and the links 25 serve as legs for the foot end of the bed. As the bed swings upwardly to its folded position, the upper facing section 23 moves toward the fabric or bed frame and may contact with the lower edges of the side-rails, thus greatly reducing the thickness of the bed and making it possible to fold the bed into a comparatively thin recess.

Bars 32 and 33 are mounted rigidly upon the bed frame parallel with the side-rails and suitable distances above side-rails, and a frame 34 is pivotally connected to the bars 32 and 33; said frame having posts 35 and 36 at its ends and locking arms 37 and 38 extending at right angles from the lower ends of the posts. Locking rings 39 and 40 are mounted upon the bars 32 and 33 and are adapted to slide over and around the hinge pins connecting the frame 34 to said bars so that when the rings 39 and 40 encircle the arms 37 and 38 and the bars 32 and 33 the frame 34 is held in a vertical position as in Figs. 1 and 2.

The bedding 41 may be of any ordinary construction and when it is desired to fold the bed into the recess the rings 39 and 40 are moved toward the hinge pins, the frame 34 is folded downwardly upon the bedding, the rings 39 and 40 moved into position to encircle the posts 35 and 36 and the bars 32 and 33, thereby securely clamping the bedding to the bed frame as required to sustain the bed in a vertical position, as shown in Figs. 4 and 5.

The details of construction may be varied in many ways without departing from the spirit of my invention as set up in the following claims.

I claim:—

1. In a wall bed, a base board, guide ways extending upwardly from the base board, a bed frame between the guide ways, means for connecting the bed frame to the guide ways, links connecting the base board to the bed frame, a facing hinged to the links intermediate of the ends of the links; and a second set of links connecting the upper end of the bed frame to the upper end of the facing; so that when the bed frame is elevated to a vertical position the facing moves toward the bed frame and so that when the bed frame is lowered to its horizontal position the facing moves away from the bed frame.

2. In a wall bed, a base board adapted to be rigidly secured to the floor of a room; side boards extending upwardly from the base board; a bed frame between the side boards; means for pivotally and slidingly connecting the bed frame to the side boards so that the lower or inner end of the bed frame will move up and down when tilted; and a facing pivotally connected to the upper or outer end of the bed frame and extending to the base board; so that when the bed frame is moved to a vertical position the facing will move toward the bed frame and so that when the bed frame is moved to a horizontal position the facing will move away from the bed frame.

3. In a wall bed, a base board adapted to be rigidly secured to the floor of a room; side boards extending upwardly from the base board; a bed frame between the side boards; means for pivotally and slidingly connecting the bed frame to the side boards so that the lower or inner end of the bed frame will move up and down when tilted; a facing pivotally connected to the upper or outer end of the bed frame and extending to the base board; so that when the bed frame is moved to a vertical position the facing will move toward the bed frame and so that when the bed frame is moved to a horizontal position the facing will move away from the bed frame; a head board pivotally connected to the bed frame and slidingly mounted between the side boards; and a counter-balancing weight carried by the head board.

HENRY C. MULVANEY.

Witnesses:
A. MILNE,
CHAS. PERRY.